United States Patent [19]
Wakabayashi et al.

[11] Patent Number: 5,903,634
[45] Date of Patent: May 11, 1999

[54] TELEPHONE NUMBER DISPLAY APPARATUS LISTING TELEPHONE NUMBERS BY FREQUENCY OF USE

[75] Inventors: Misao Wakabayashi; Misa Kawasaki, both of Tokyo, Japan

[73] Assignee: NEC Corporation, Japan

[21] Appl. No.: 08/821,612

[22] Filed: Mar. 20, 1997

Related U.S. Application Data

[63] Continuation of application No. 08/510,978, Aug. 3, 1995, abandoned.

[30] Foreign Application Priority Data

Aug. 4, 1994 [JP] Japan ................................ 6-183193

[51] Int. Cl.$^6$ ............................ H04M 15/00; H04M 1/00
[52] U.S. Cl. ........................ 379/127; 379/354; 379/355; 379/356
[58] Field of Search ................................. 379/127, 142, 379/354, 355, 356, 396; 455/403, 407, 415, 517, 566

[56] References Cited

U.S. PATENT DOCUMENTS

| | | | |
|---|---|---|---|
| 4,275,273 | 6/1981 | Ts' Ao | 379/355 |
| 4,726,059 | 2/1988 | Havel | 379/354 |
| 4,845,745 | 7/1989 | Havel | 379/396 |
| 5,222,127 | 6/1993 | Fukui | 379/131 |
| 5,267,308 | 11/1993 | Jokinen | 379/353 |
| 5,343,518 | 8/1994 | Kneipp | 379/356 |
| 5,457,738 | 10/1995 | Sylvan | 379/354 |

FOREIGN PATENT DOCUMENTS

| | | |
|---|---|---|
| 477854 | 9/1991 | European Pat. Off. . |
| 538166 | 9/1992 | European Pat. Off. . |
| 62-294352 | 12/1987 | Japan . |

OTHER PUBLICATIONS

WPI Abstract Accession No. 95–250213/33 and JP 71–0054461, Nov. 29, 1993.
WPI Abstract Accession No. 88–033783/05 and JP 62–0294352, Dec. 21, 1987.

*Primary Examiner*—Vijay Shankar
*Attorney, Agent, or Firm*—Ostrolenk, Faber, Gerb & Soffen, LLP

[57] ABSTRACT

A telephone number display apparatus stores a plurality of telephone number information data and displays the telephone number information data on a plurality of display areas divided in correspondence with a predetermined number of telephone number information data. At least part of one display area of the plurality of display areas is displayed in a color different from that of a remaining display area.

5 Claims, 3 Drawing Sheets

| USE FREQUENCY | NAME | TELEPHONE NUMBER |
|---|---|---|
| 9 | ICHIRO HIGASHI | 03-3120-9876 |
| 14 | JIRO NISHIKAWA | 045-939-6789 |
| 3 | MITSUO MINAMIMO | 06-333-6666 |
| | | |
| | | |

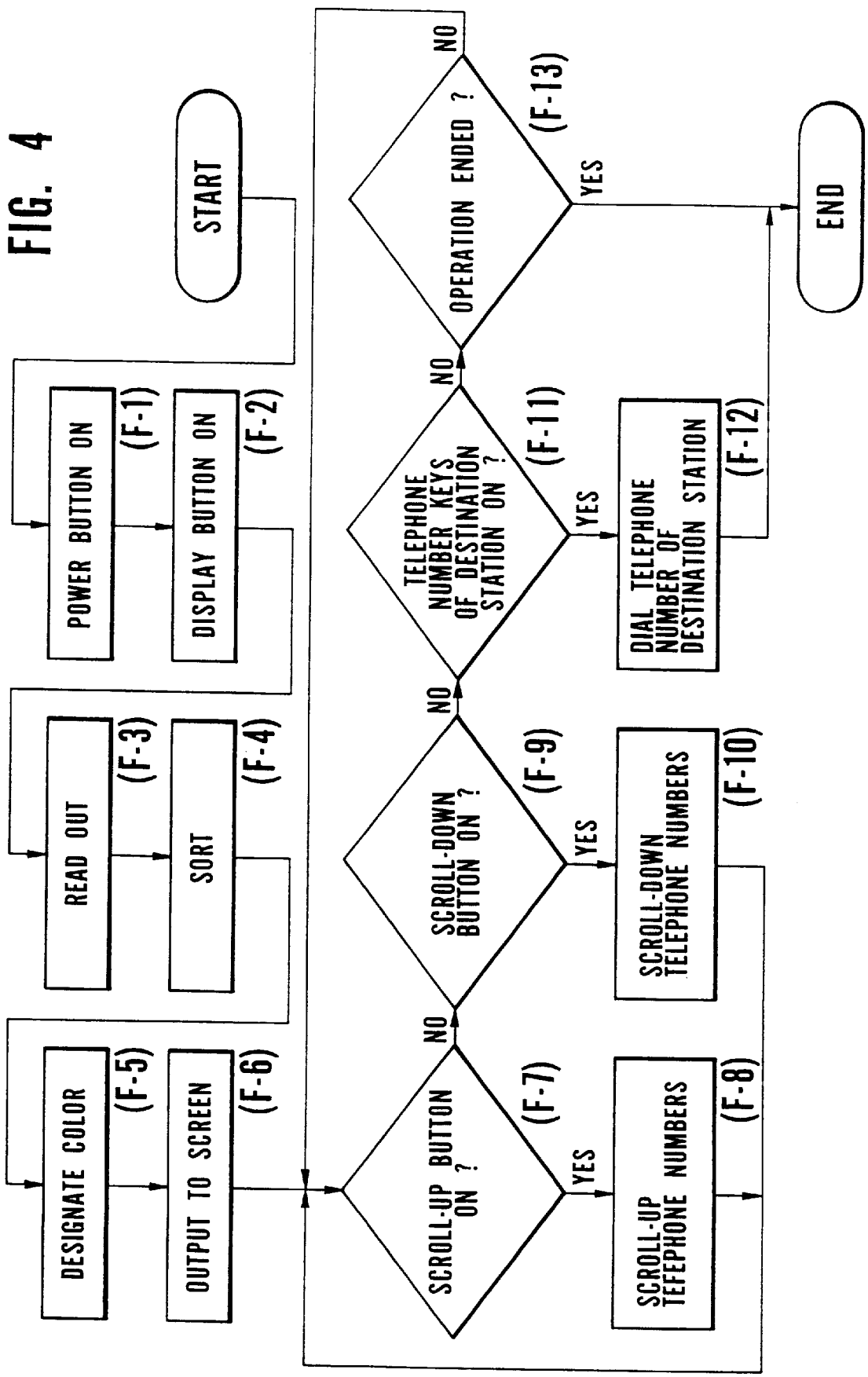

5,903,634

TELEPHONE NUMBER DISPLAY APPARATUS LISTING TELEPHONE NUMBERS BY FREQUENCY OF USE

This is a continuation of application Ser. No. 08/510,978, filed on Aug. 3, 1995, now abandoned.

BACKGROUND OF THE INVENTION

1. Field of the Invention

The present invention relates to a telephone number display apparatus for storing a plurality of telephone numbers and displaying these telephone numbers in display areas divided in correspondence with a predetermined number of telephone numbers and, more particularly, to a telephone number display apparatus for facilitating to confirm the telephone number in each display area.

2. Description of the Prior Art

As a technique associated with a telephone number display apparatus of this type, a technique is described in, e.g., Japanese Unexamined Patent Publication No. 62-294352 in which switches constituted by a touch panel and telephone numbers are electronically displayed in the order of use frequencies. The Japanese Unexamined Patent Publication No. 62-294352 discloses a multifunction telephone set which reads out a plurality of telephone numbers and the use frequencies of these telephone numbers from a storing means in accordance with a designation signal output by touching the touch panel, and displays the telephone numbers on an electronic display means in the order of use frequencies.

In the conventional telephone number display apparatuses, including the apparatus described in the above prior art, the telephone numbers displayed on the display unit are arranged in the order of use frequencies. For this reason, the order may change every time a telephone number is read out to make call origination. As a result, to search a target telephone number in a telephone number list consisting of similar numerals and data, telephone numbers must be confirmed one by one, resulting in an increase in time required for searching and confirmation.

When telephone numbers on the display screen are to be moved at a high speed by scrolling the telephone numbers, the position of the displayed telephone numbers must be set to the first, the last, or the intermediate one of the registered and arranged telephone numbers at only the start or end of scrolling. Therefore, determination during the movement of the telephone numbers by scrolling is difficult.

SUMMARY OF THE INVENTION

It is an object of the present invention to provide a telephone number display apparatus which allows easy position confirmation in a telephone number list even during scrolling by making the color of at least part of a telephone number display area different from the remaining telephone number display areas, thereby shortening the time required for searching and confirming a telephone number.

In order to achieve the above object, according to the basic aspect of the present invention, there is provided a telephone number display apparatus for storing a plurality of telephone number information data and displaying the telephone number information data on a plurality of display areas divided in correspondence with a predetermined number of telephone number information data, wherein at least part of one display area of the plurality of display areas is displayed in a color different from that of a remaining display area.

On the basis of the above basic aspect, the present invention has the following aspects.

The telephone number information data in the basic aspect include telephone numbers and various information data associated with the telephone numbers, and the telephone number and at least part of the various information data associated with the telephone numbers are displayed on each of the display areas.

At least part of a background or characters on the one display area in the basic aspect is displayed in a color different from that of the remaining display area or with a change in shade of the different color.

At least part of each of the plurality of display areas in the basic aspect is displayed while sequentially or continuously changing a color of each of the display areas from a warm color to a cold color.

Telephone numbers are arranged on the plurality of display areas in the basic aspect in an order of use frequencies, a display area for displaying a telephone number with a high use frequency is displayed in a hue of one of a warm color and a light color, and a display area for displaying a telephone number with a low use frequency is displayed in a hue of one of a cold color and a dark color.

According to another aspect of the present invention, there is provided a telephone number display apparatus for storing a plurality of telephone number information data and displaying the telephone number information data on a plurality of display areas divided in correspondence with a predetermined number of telephone number information data, wherein telephone numbers are arranged on the plurality of display areas in an order of use frequencies, a display area for displaying a telephone number corresponding to an intermediate use frequency is displayed in a hue of one of a warm color and a light color, and a display area for displaying a telephone number with a high use frequency and a display area for displaying a telephone number with a low use frequency are displayed in a hue of one of a cold color and a dark color.

According to the telephone number display apparatus of the present invention having the above aspects, the hue changes for each display area for displaying a stored telephone number or in one display area. Therefore, a change in hue is caused in the display unit during scrolling the display areas. As a result, in accordance with the change in color with a high visibility, an approximate position of a desired telephone number or data in the display order of the registered telephone numbers or data can be easily known even during high-speed movement by scrolling or even in a small display area of the display unit. That is, the target telephone number can be easily searched from the displayed telephone numbers.

The above and many other advantages, features and additional objects of the present invention will become manifest to those versed in the art upon making reference to the following detailed description and accompanying drawings in which preferred structural embodiments incorporating the principles of the present invention are shown by way of illustrative example.

BRIEF DESCRIPTION OF THE DRAWINGS

FIG. 4 is a flow chart showing the operation of the embodiment of the present invention.

DETAILED DESCRIPTION OF THE PREFERRED EMBODIMENT

The present invention will be described below in more detail in association with a preferred embodiment shown in the accompanying drawings.

Figures 1, 3:
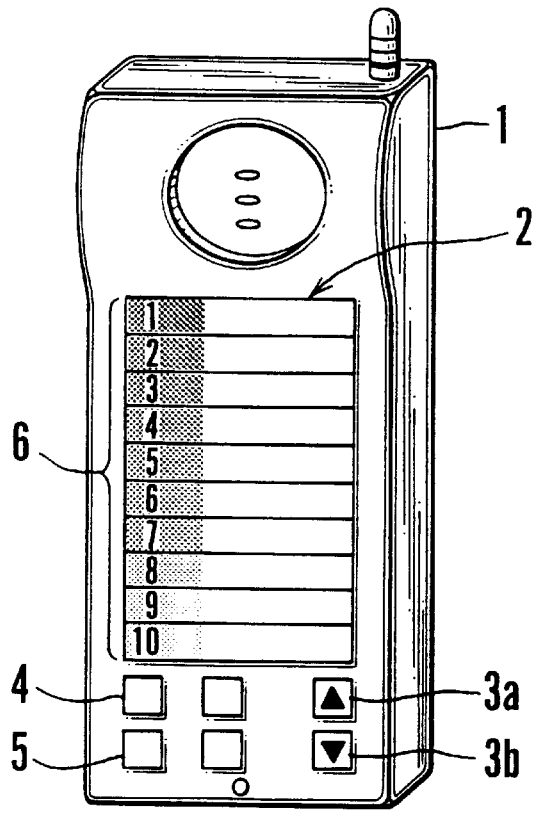
FIG. 1 is a view showing the outer appearance of a cellular phone having an embodiment of the present invention.
FIG. 3 is an explanatory view showing an example of data stored in a telephone number storing unit shown in FIG. 2.

FIG. 1 is a view showing the outer appearance of a cellular phone having an embodiment of the present invention. A telephone number display apparatus shown in FIG. 1 is incorporated in a cellular phone body 1. After the phone is powered on by depressing a power button 5, a display button 4 is depressed to display registered telephone numbers on a display unit 2 in the order of use frequencies. The display unit 2 has, e.g., ten pieces of telephone number information data in one display area 6. The order list of the telephone numbers displayed on the display unit 2 can be scrolled upward by depressing a scroll-up button 3a so as to sequentially display telephone numbers in the lower order. On the other hand, when a scroll-down button 3b is depressed, the order list of the telephone numbers displayed on the display unit 2 is scrolled downward to sequentially display the telephone numbers in the upper order.

Each of display areas 6-1 to 6-10 of the telephone numbers displayed on the display unit 2, or at least one of them has a color different from that of the remaining display areas. Therefore, the display unit 2 shown in FIG. 1 is constituted by, e.g., a liquid crystal display (LCD) unit allowing color display.

Figure 2:
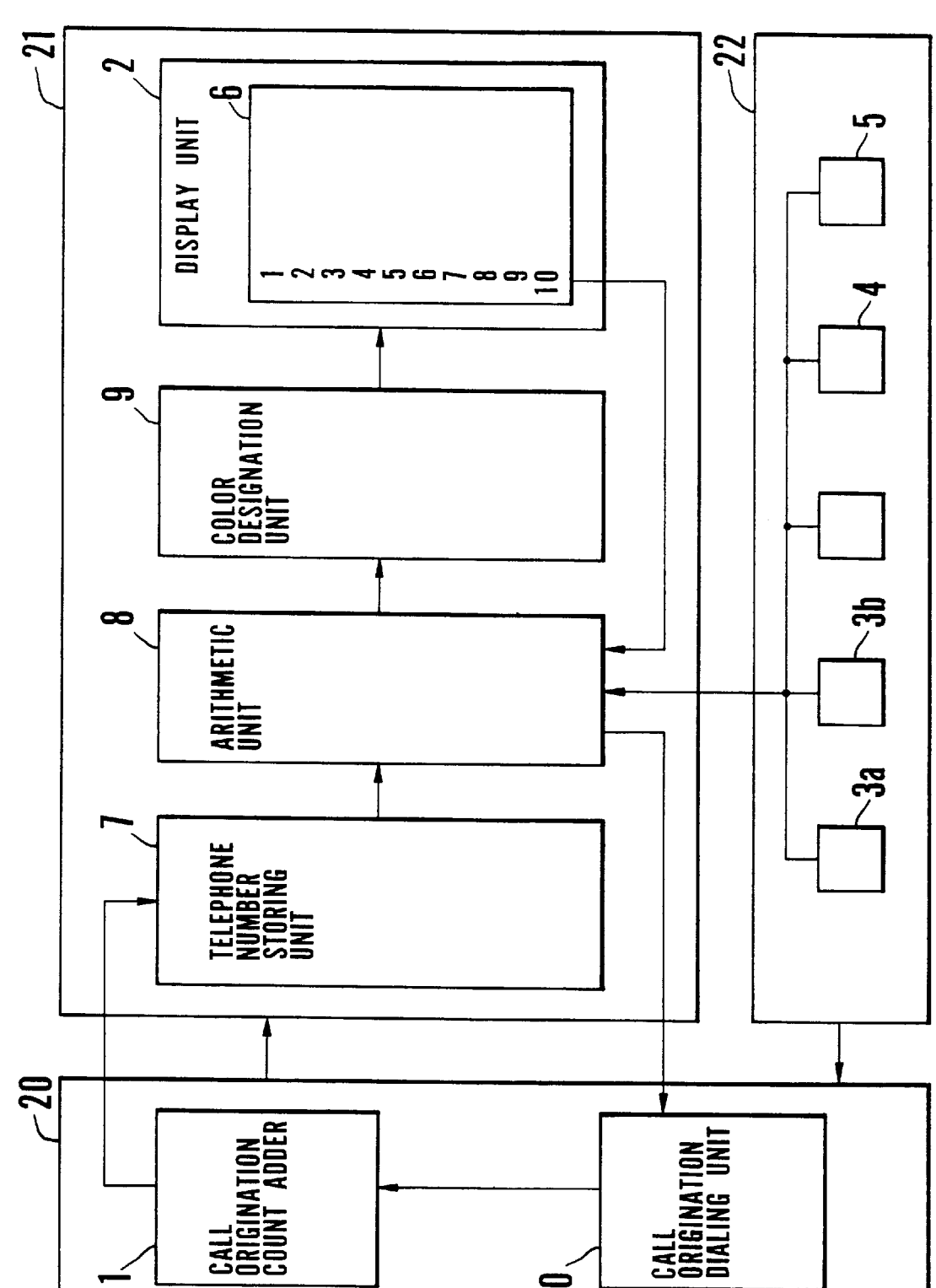
FIG. 2 is a block diagram showing the arrangement of the embodiment of the present invention.

FIG. 2 is a block diagram showing the arrangement of the embodiment of the present invention. The arrangement of the telephone number display apparatus will be described below with reference to FIGS. 1 to 3.

As shown in FIG. 2, the cellular phone body 1 incorporates a telephone circuit unit 20, a telephone number display unit 21, and a keyboard 22. The telephone number display unit 21 has a telephone number storing unit 7, an arithmetic unit 8, and a color designation unit 9, in addition to the display unit 2. The keyboard 22 has the scroll-up and scroll-down buttons 3a and 3b, the display button 4, and the power button 5. Further, the telephone circuit unit 20 has a call origination dialing unit 10 connected to the arithmetic unit 8 and a call origination count adder 11 connected to the telephone number storing unit 7.

As shown in FIG. 3, a use frequency 31 and a name 32 are stored and registered in the telephone number storing unit 7 as data corresponding to a telephone number 33. When the telephone number 33 is registered in the telephone number storing unit 7, the name 32 is recorded as corresponding data, and an initial value of "0" is set to the use frequency 31. When an origination telephone number is notified from the telephone circuit unit 20, it is checked whether the notified telephone number is registered. If YES, the value of the use frequency 31 is incremented by one and updated.

The operation associated with the embodiment of the present invention will be described below with reference to a flow chart shown in FIG. 4.

When the power button 5 is turned on (F-1), the cellular phone body 1 is set in a power-on state. The telephone circuit unit 20 is driven to enable call origination. In this state, when the display button 4 of the keyboard 22 is depressed (F-2), the arithmetic unit 8 reads out the telephone numbers 33 and various data (e.g., the use frequencies 31 and the names 32) associated with the telephone numbers 33 (F-3) from the telephone number storing unit 7, rearranges the telephone numbers 33 and the data (names 32) in the order of larger values of the use frequencies 31, and outputs the data to the color designation unit 9 (F-4).

The color designation unit 9 designates a warm color as the background of the display area 6 of the display unit 2 for a telephone number with the high use frequency 31 and sequentially designates cold colors for telephone numbers 31 with the lower use frequencies 31 (F-5), and outputs the data to the display unit 2 (F-6). With this arrangement, the color of the display unit 2 changes downward from the warm color to the cold color. When the display area 6 of the telephone numbers 33 is moved by the scroll-up button 3a (F-7), the color of the display unit 2 entirely changes from the warm color to the cold color (F-8). On the other hand, the display area 6 is moved by the scroll-down button 3b in the opposite direction (F-9), the color of the display unit 2 entirely changes from the cold color to the warm color (F-10). Therefore, the approximate positions of the displayed telephone numbers in the registered telephone numbers 33 can be confirmed in accordance with the hue.

As the color designation unit 9 for changing the color of the display unit 2, e.g., a technique described in Japanese Unexamined Patent Publication No. 63-70893 can be used. When two colors indicating the highest and lowest use frequencies are set in advance, and the light emission ratio of these colors is designated in accordance with the number of displayed telephone numbers, the telephone numbers are displayed on the display unit 2 in accordance with designated color ratios. More specifically, yellow and blue are set as the two colors. When the number of displayed telephone numbers is 11, the light emission ratio of colors is set from 0% to 100% as combinations in units of 10%. That is, for a telephone number with the highest use frequency, a ratio of 100% of yellow and 0% of blue is set. For the sixth telephone number with an intermediate use frequency, a ratio of 50% of yellow and 50% of blue is set. For a telephone number with the lowest use frequency, a ratio of 0% of yellow and 100% of blue is set. Setting of the two colors can be changed before the operation of the display button 4.

A call origination operation from the telephone set after display of the desired telephone number on the display unit 2 will be described. When call origination is to be made for the telephone number displayed on the display area 6-5, the number "5" at the left end of the display unit 2 shown in FIG. 1 is depressed (F-11), thereby dialing the corresponding telephone number from the call origination dialing unit 10 (F-12). In general call origination, the display button 4 need not be operated. Subsequent to turning on the power button 5, numbers at the left end of the display unit 2 are touched and depressed in the order of dial numbers, thereby performing the dialing operation.

To end the operation, an operation end button is depressed (F-13).

In the above description, a warm color is sequentially designated as the color of background of the display area of the display unit for a telephone number with a high use frequency while a cold color is sequentially designated for a telephone number with a lower use frequency. However, the characters in the display area may also be displayed while changing the color, and the color may also be continuously changed. A cold color may be designated for a telephone number with a high use frequency. The telephone numbers are arranged in the order of higher use frequencies. However, the telephone numbers may also be arranged in the order of lower use frequencies. Instead of changing the hue from a warm color to a cold color, a change in lightness or saturation in the same hue may also be applied. The range of sequential change or the range of continuous change is not limited in a single display area, and the display area may be partially changed.

Alternatively, an intermediate portion of the display order, e.g., a warmest or coldest, or a darkest or lightest color may be set at a position 1/3 from the highest use frequency, and the hue or the density of a color may be changed in the opposite directions. With this arrangement, when a large number of telephone numbers are registered, the approximate position in the entire order can be more easily determined. At least one of the hue and the density of a color, and at least one of the background of the display area and the characters must be set. However, both of them may be simultaneously set.

As described above, a different color also means a change in any one of color, hue, and color tone.

The above description has been made for a cellular phone. However, it can also be applied to another general desk telephone set, a cordless phone, and a single data display apparatus for displaying data in an order. The present invention is not limited to the above description.

What is claimed is:

1. A telephone number display apparatus for storing telephone number information data and displaying the telephone number information data on a plurality of display lines, each of said display lines comprising a display area divided from others of the display areas, wherein said telephone number information data includes telephone numbers and various information data associated with respective ones of the telephone numbers, and wherein the telephone numbers and at least part of the various information data are displayed on respective ones of said display areas, and wherein said telephone numbers are arranged on said plurality of display lines in an order of frequency of use, at least part of a background of a display area for displaying a telephone number corresponding to an intermediate frequency of use being displayed in a hue of one of a warm color and a light color, at least part of a background of a display area for displaying a telephone number with a high frequency of use and at least part of a background of a display area for displaying a telephone number with a low frequency of use being displayed in a hue of one of a cold color and a dark color.

2. A telephone number display apparatus for storing telephone number information data and displaying the telephone number information data on a plurality of display lines, each of said display lines comprising a display area divided from others of the display areas so as to correspond to respective ones of the telephone numbers of said telephone number information data, said apparatus comprising:

a cellular phone body;

a telephone circuit unit incorporated with said cellular phone body and including a telephone number storing unit, an arithmetic unit, a color designation unit, and a display unit; and a keyboard including a power button, a display button, a scroll-up button, and a scroll-down button;

wherein said telephone number information data includes telephone numbers and various information data associated with respective ones of the telephone numbers and wherein at least two of the telephone numbers and at least part of the various information data are displayed on respective ones of said display areas, and further wherein said telephone number information data are displayed on said plurality of display areas in an order of frequency of use, said telephone number information data being capable of being moved bi-directionally by depressing said scroll-up button or said scroll down button, and wherein at least part of a background of at least one display area of said plurality of display areas is displayed in a color different from that of remaining ones of said display areas.

3. An apparatus according to claim 2, wherein at least part of a background or characters on said one display area is displayed in a color different from that of said remaining display area while changing a shade of a color.

4. An apparatus according to claim 2, wherein at least part of each of said plurality of display areas is displayed while sequentially or continuously changing a color of each of said display areas from a warm color to a cold color.

5. An apparatus according to claim 4, wherein a display area for displaying a telephone number with a high frequency of use is displayed in a hue of one of a warm color and a light color, and a display area for displaying a telephone number with a low use frequency is displayed in a hue of one of a cold color and a dark color.

* * * * *